United States Patent
Pan et al.

(10) Patent No.: US 7,646,671 B2
(45) Date of Patent: Jan. 12, 2010

(54) METHOD FOR PROCESSING MARINE TOWED STREAMER SEISMIC DATA FROM REGULAR MULTI-AZIMUTH SURVEYS

(75) Inventors: Naide Pan, Sugar Land, TX (US); Christian Strand, Hafslundsoy (NO)

(73) Assignee: PGS Geophysical AS, Lysaker (NO)

( * ) Notice: Subject to any disclaimer, the term of this patent is extended or adjusted under 35 U.S.C. 154(b) by 11 days.

(21) Appl. No.: 12/001,390

(22) Filed: Dec. 11, 2007

(65) Prior Publication Data

US 2009/0147620 A1 Jun. 11, 2009

(51) Int. Cl.
*G01V 1/38* (2006.01)
(52) U.S. Cl. ......................................................... 367/21
(58) Field of Classification Search .................. 367/15, 367/21–24, 38
See application file for complete search history.

(56) References Cited

U.S. PATENT DOCUMENTS

| | | | | |
|---|---|---|---|---|
| 4,964,098 | A * | 10/1990 | Hornbostel | 367/73 |
| 5,029,145 | A * | 7/1991 | Marsden et al. | 367/56 |
| 5,963,879 | A * | 10/1999 | Woodward et al. | 702/17 |
| 6,498,768 | B1 * | 12/2002 | Gjestrum et al. | 367/20 |
| 2006/0018191 | A1 * | 1/2006 | Kappius et al. | 367/38 |

OTHER PUBLICATIONS

"Multi-Azimuth Seismic", Techlink, vol. 5, No. 3, Jul. 2005. http://www.pgs.com/upload/31174/data.pdf.*
Keggin, James, et al., 2006, "Key aspects of multi-azimuth acquisition and processing", 76 Ann. Intl. Mtg., SEG Expanded Abstracts, pp. 2886-2890.
Michell, Scott, et al., 2006, "Wide azimuth streamer imaging of Mad Dog: Have we solved the subsalt imaging problem?", 76 Ann. Intl. Mtg., SEG Expanded Abstracts, pp. 2905-2909.
Reksnes, Per Arild, et al., Dec. 2002, "How PGS created a new image for the Varg field", First Break, EAGE, vol. 20, No. 12, pp. 773-777.
Padhi, Trilochan, et al., Feb. 1997, "Wide azimuths—why not", The Leading Edge, vol. 16, No., pp. 175-177.
Long, Andrew, Dec. 2006, "How multi-azimuth and wide-azimuth seismic compare", First Break, EAGE, vol. 24, No. 12, pp. 55-61.
Barley, Brian, et al., Apr. 2007, "Multi-azimuth and wide-azimuth seismic: Shallow to deep water, exploration to production", The Leading Edge, SEG, vol. 26, No. 4, pp. 450-458.

(Continued)

*Primary Examiner*—Jack W. Keith
*Assistant Examiner*—Krystine Saito
(74) *Attorney, Agent, or Firm*—E. Eugene Thigpen; Charles R. Schweppe

(57) ABSTRACT

Marine towed streamer seismic data are combined from a first survey and a second survey, wherein the first survey and the second survey are shot with a bin size of L×L and the second survey is shot with a shooting direction rotated 90° relative to the shooting direction of the first survey. The combined seismic data from the first and second surveys are binned on a bin grid with a bin size of $$\frac{L}{\sqrt{2}} \times \frac{L}{\sqrt{2}}$$

and with a bin grid orientation rotated 45° relative to the shooting directions of the first and second surveys. Then, seismic data processing is applied to the binned seismic data to create an image of the Earth's subsurface.

26 Claims, 14 Drawing Sheets

OTHER PUBLICATIONS

Corcoran, Chris, et al., Apr. 2007, "A wide-azimuth streamer acquisition pilot project in the Gulf of Mexico", The Leading Edge, SEG, vol. 26, No. 4, pp. 460-468.

Michel, Scott, et al., Apr. 2007, "Dual azimuth versus wide-azimuth technology as applied in subsalt imaging of Mad Dog Field—a case study", The Leading Edge, SEG, vol. 26, No. 4, pp. 470-478.

Howard, Mike, Apr. 2007, "Marine seismic surveys with enhanced azimuth coverage: Lessons in survey design and acquisition"; The Leading Edge, SEG, vol. 26, No. 4, pp. 480-493.

Manning, Ted, et al., Apr. 2007, "Quantifying and increasing the value of multi-azimuth seismic", The Leading Edge, SEG, vol. 26, No. 4, pp. 510-520.

Rietveld, Walter E.A., et al., 2006, "Multi-azimuth Streamer Acquisition—Initial data analysis", SEG, Expanded Abstracts 25, pp. 2837-2841.

Keggin, Jim, et al., 2006, "Multi-azimuth towed streamer 3D Seismic in the Nile Delta, Egypt", SEG Expanded Abstracts 25, pp. 2891-2895.

Howard, M.S, et al., 2006, "Marine survey design for rich-azimuth seismic using surface streamers", SEG Expanded Abstracts 25, pp. 2915-2919.

Liu, Qinglin, et al, 2006, Fracture detection by P and C wave anisotropy from multi-azimuth VSP, SEG Expanded Abstracts 25, pp. 3422-3426.

Manning, Ted, et al., 2006, "Multi-azimuth (MAZ) towed streamer data processing flow from the Nile Delta", SEG Expanded Abstracts 25, pp. 2842-2846.

* cited by examiner

METHOD FOR PROCESSING MARINE TOWED STREAMER SEISMIC DATA FROM REGULAR MULTI-AZIMUTH SURVEYS

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of marine seismic surveying with towed streamers.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes and recorded.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors (typically pressure gradient sensors), particularly in marine surveys. Sometimes particle acceleration sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of arrays.

The resulting seismic data obtained in performing the survey is processed to yield information relating to the geologic structure and properties of the subterranean formations in the area being surveyed. The seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the Earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers have been proposed that contain water particle velocity sensors such as geophones or particle acceleration sensors such as accelerometers, in addition to hydrophones. The pressure sensors and particle motion sensors may be deployed in close proximity, collocated in pairs or pairs of arrays along a seismic cable.

Unfortunately, several asymmetrical features are involved in conventional 3D marine seismic acquisition by towed streamer. These features include asymmetrical spatial sampling and fold between inline and cross-line directions, asymmetrical illumination due to single direction shooting, and asymmetrical offsets between streamer length and streamer span width. Thus, the single-direction shooting in towed streamer acquisition typically results in a regular but asymmetrical array of seismic data sampling points, such as Common Mid Points (CMP's). The sampling density of the sampling points is denser in the inline direction (parallel to the towed streamers) than in the cross-line direction (perpendicular to the towed streamers). The asymmetry is due to a wider spacing between receivers in separate streamers than between receivers in the same streamer.

Some new marine acquisition technologies have been developed recently to address and mitigate the above weakness of the conventional towed streamer seismic systems. These technologies include High Density (HD) surveys, Multi-Azimuth Towed Streamer (MATS) surveys, and Wide-Azimuth Towed Streamer (WATS) surveys. The first of these technologies, HD, attempts to solve the asymmetrical sampling issue while the latter two, MATS and WATS, attempt to address the asymmetrical illumination and offsets issues. All these technologies achieve signal-to-noise ratio improvement in the same way by acquiring and stacking more data for the same area.

HD technology is still a single-direction shooting method. HD technology addresses the asymmetrical sampling issue by reducing separation of streamers and increasing the cross-line density of streamer passes. For instance, reducing the separation of streamers to half or doubling the number of streamer passes would double the cross-line density of sampling points. For HD surveys, twice the streamer passes, at roughly twice the cost, gives twice the sampling density as conventional shooting.

Multi-Azimuth Towed Streamer technology is a multi-direction shooting method. MATS addresses the asymmetrical illumination issue by increasing the number of directions (azimuths) that streamer passes are made in. Increasing the azimuths increases the illumination of the seismic targets, but does not, in general, increase the sampling density. For MATS, twice the streamer passes, at roughly twice the cost, gives increased illumination, but the same sampling density as conventional shooting. Thus, for the same cost, HD delivers denser spatial sampling than MATS. Additional cost for more azimuths and sparser spatial sampling than HD are two main constraints preventing multi-azimuth techniques such as MATS from being a more popular exploration tool.

Thus, a need exists for a method for acquiring marine towed streamer seismic data that improves both the spatial sampling density and the illumination over convention acquisition techniques. In particular, a need exists for a method for processing multi-azimuth seismic data that yields greater spatial sampling density than conventional processing does.

BRIEF SUMMARY OF THE INVENTION

The invention is a method for processing marine towed streamer seismic data from regular multi-azimuth surveys. Seismic data are combined from a first survey and a second survey, wherein the first survey and the second survey are shot with a bin size of L×L and the second survey is shot with a shooting direction rotated 90° relative to the shooting direction of the first survey. The combined seismic data from the first and second surveys are binned on a bin grid with a bin size of $$\frac{L}{\sqrt{2}} \times \frac{L}{\sqrt{2}}$$

and with a bin grid orientation rotated 45° relative to the shooting directions of the first and second surveys. Then, seismic data processing is applied to the binned seismic data to create an image of Earth's subsurface.

BRIEF DESCRIPTION OF THE DRAWINGS

The invention and its advantages may be more easily understood by reference to the following detailed description and the attached drawings, in which.

Figure 1A:
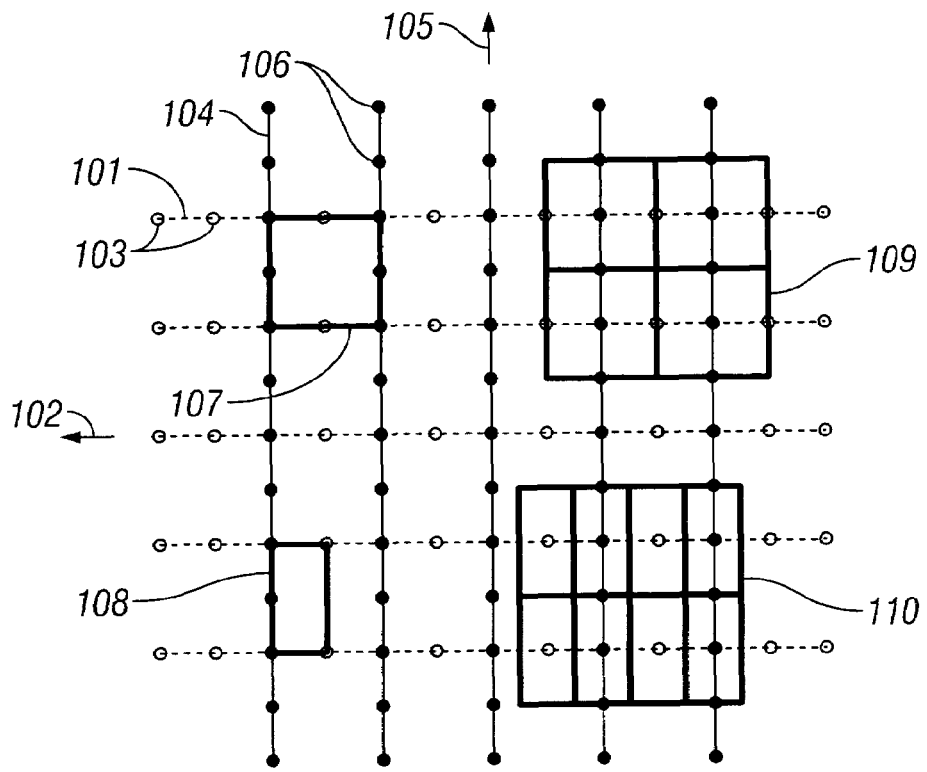
FIGS. 1A and 1B are diagrams of the configuration of sampling points generated by two-azimuth orthogonal shooting.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for processing marine towed streamer seismic data that yields higher spatial sampling density than conventional processing. In particular, the invention is a method for processing the data from regular multi-azimuth acquisition. Examples of regular multi-azimuth acquisition include two-azimuth orthogonal shooting, three- and four-azimuth cascaded orthogonal shooting, and three-azimuth equilateral triangular shooting, which will be illustrated below. The invention will be discussed in terms of these examples, although this choice of examples is for purposes of illustration only and is not intended as a limitation of the invention.

Marine seismic 3D has been typically shot in a single direction. For example, consider a conventional single-direction configuration for marine towed streamer seismic acquisition. This configuration would have streamers spaced 100 m apart in the cross-line direction and receivers spaced 12.5 m apart (also called the group interval) along the streamers in the inline direction. With two seismic sources spaced 50 m apart, this conventional streamer configuration can yield a bin size around each sampling point of 12.5 m (inline)×25 m (cross-line). The bin-size will further decide the maximum spatial frequency achievable in migration without causing aliasing.

HD shooting could be used to double the number of streamer passes in the cross-line direction. In practice, HD can be realized by either halving the separation between the streamers or by doubling the number of streamer passes in an interleaved fashion. For the example given above, the streamer passes can be interleaved and so spaced 50 m apart and would yield an improved (smaller) bin size of 12.5 m (inline)×12.5 m (cross-line). This shooting provides twice the spatial sampling density for approximately twice the surveying cost. The smaller bin-size can provide higher spatial frequency and greater achievable resolution.

A first embodiment of the method of the invention employs two-azimuth orthogonal shooting, which is regular two-azimuth MATS shooting. A first survey line is shot in a first direction, as in a conventional single-direction shooting. A second survey line is then shot in a second direction, or azimuth, orthogonal to the first survey line, that is, with an angle of 90° between the first and second survey lines. In contrast to HD, two-azimuth orthogonal shooting comprises two orthogonal copies of conventional towed streamer shooting instead of two parallel copies.

The orthogonality of the two survey lines enables the sampling points of the two survey lines to be positioned to line up so as to overlie each other. The orthogonality of the survey lines and overlapping of the sampling points makes this a regular two-azimuth shooting. An irregular shooting pattern would have the second survey line at an arbitrary angle with respect to the first survey line. An irregular shooting pattern would not yield the additional smaller bin size and so is not used in the method of the invention.

Figure 1B:
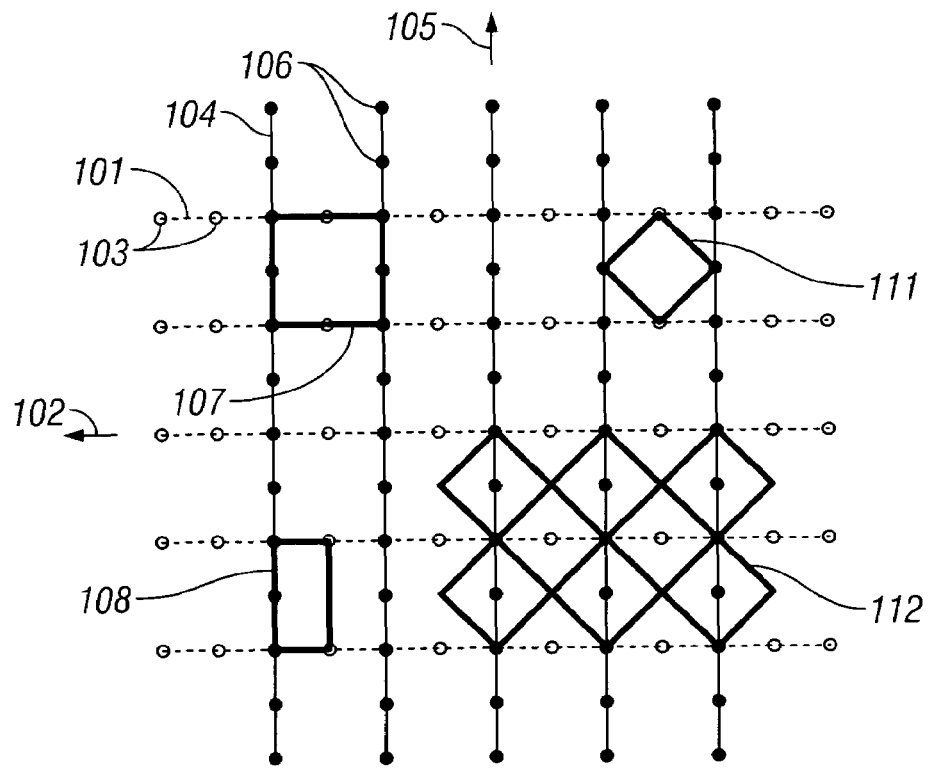

FIGS. 1A and 1B show diagrams of the configuration of sampling points generated by two-azimuth orthogonal shooting. The first survey line 101 is shown in a W-E (West-East) direction 102; that is, traveling from right to left as depicted in FIG. 1A. The sampling points 103 for the first survey line 101 are shown as open circles on dashed lines. The second survey line 104 is shown orthogonal to the first survey line 101 in a N-S (North-South) direction 105, that is, traveling from bottom to top as depicted in FIG. 1A. The sampling points 106 for the second survey line 104 are shown as filled circles on solid lines.

Here, in the case discussed with regard to FIGS. 1A and 1B, the streamers are configured as in the conventional streamer configuration described above. Using the example configuration discussed above, the streamers are 100 m apart, the receivers are spaced 12.5 m apart, and two seismic sources are spaced 50 m apart. Conventional seismic data processing would define a bin 107 with a symmetrical bin size of 25 m×25 m, even though a bin 108 of 12.5 m (inline)×25 m (cross-line) would often be used in the seismic data processing. Typically, though, the bin grid would be defined with square bin 107 shifted to bins 109, centered on the sampling points 103, 106, as shown in FIG. 1A. (Similarly, if smaller rectangular bin 108 were used, then the bin grid would typically be defined as shifted bins 110.) For each conventional bin 107, there are four sampling points which are located at the midpoint of each side of the conventional bin 107. This is inherently relevant to denser sampling (12.5 m or even 6.25 m sampling interval) in inline typical for marine 3D acquisition. Importantly, these four additional sampling points located on the sides of each conventional bin can create a smaller bin 111 diagonal to the original larger bin 107, as shown in FIG. 1B.

Thus, the method of the invention recognizes an alternative bin 111 with a bin size of approximately 17.5 m×17.5 m. For both practical and illustrative purposes, the bin side lengths are referred to as 17.5 m, although theoretically the lengths are $$\frac{25\,m}{\sqrt{2}} = 17.67776695\,m.$$

The geometry of the pattern of the sampling points 103, 106 yielding the smaller alternate bin 111 originates in the asymmetry typical in marine seismic data acquisition with denser spatial sampling in the inline than in the cross-line directions. This new bin 111 is smaller than the 25 m×25 m bin found in conventional single-direction towed streamer shooting, but is not as small as the 12.5 m×12.5 m bin generated in HD. However, this embodiment of the invention provides the additional benefit of improved illumination from shooting in two azimuth directions. Thus this embodiment of the invention provides both improved illumination and improved spatial sampling density, by a factor of $\sqrt{2}$, above conventional towed streamer shooting for approximately the same cost as HD. Again, the bin grid would be defined with bin 111 shifted to bins 112, centered on the sampling points 103, 106, as shown in FIG. 1B.

A second embodiment of the method of the invention employs three-azimuth cascaded orthogonal shooting, which is a form of regular three-azimuth MATS shooting. The first two survey lines are the orthogonal survey lines as shot in orthogonal shooting, discussed above with reference to FIGS. 1A and 1B. A third survey line is shot in a third direction diagonal to both the first survey line and the second survey line, that is, with an angle of 45° between the third survey line and the first survey line as well as an angle of 45° between the third survey line and the second survey line. However, the spacing between the streamers for the third streamer line must change to approximately 70 m apart for the sampling points to line up in a regular arrangement. For both practical and illustrative purposes, the streamer spacing is referred to as 70 m, although theoretically the spacing is $$\frac{100\,m}{\sqrt{2}} \approx 70.7016781\,m.$$

Also, the receiver spacing must be changed to approximately $$17.5\,m \left( \approx \frac{25\,m}{\sqrt{2}} \right).$$

The change in receiver spacing need not be physical, but can be accomplished by interpolation of the values recorded at the existing receiver positions. These spacing changes insure that the sampling points from the third survey line line up so as to overlie the sampling points from the first and second survey lines. Thus, the pattern of the sampling points is regular.

Figure 2:
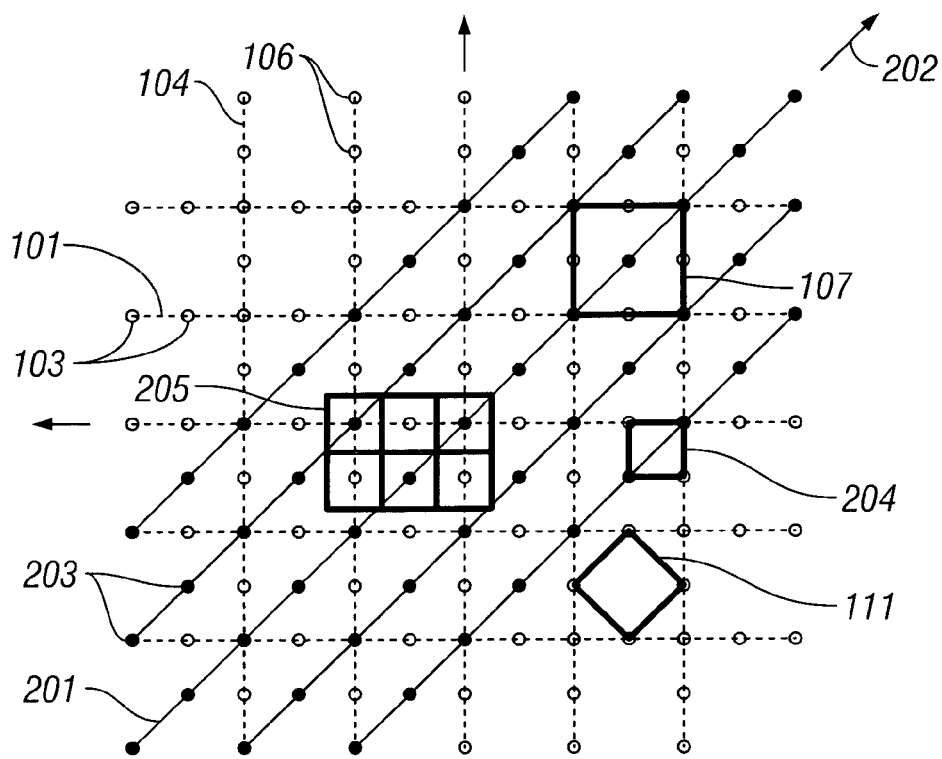
FIG. 2 is a diagram of the configuration of sampling points generated by three-azimuth cascaded orthogonal shooting.

FIG. 2 shows a diagram of the configuration of sampling points generated by three-azimuth cascaded orthogonal shooting. The sampling points 103 for the first survey line 101 and the sampling points 106 for the second survey line 104, from FIG. 1, are both now shown as open circles on dashed lines. The third survey line 201 is shown in a NE-SW direction 202, that is, traveling from the lower left to the upper right as depicted in FIG. 2. The sampling points 203 for the new survey line, the third survey line 201, are shown as filled circles on solid lines, to distinguish them from the previous survey lines, that is, the first survey line 101 and the second survey line 104.

Again, in the case discussed with regard to FIG. 2, conventional seismic data processing would define a conventional bin 107 with a bin size of 25 m×25 m. Further, the method of the invention recognizes the alternative bin 111 with a bin size of approximately 17.5 m×17.5 m, as discussed above with reference to FIGS. 1A and 1B. However, the method of the invention recognizes yet another alternative bin 204 with a bin size of 12.5 m×12.5 m. Thus, this embodiment of the invention yields the same bin size as the single direction HD shooting with the additional benefit of improved illumination from shooting in three azimuth directions. Again, the bin grid would be defined with bin 204 shifted to bins 205, centered on the sampling points 103, 106, 203.

Further, if one starts with a streamer spacing of 50 m, instead of 100 m, for the first survey line 101 and second survey line 104 and a streamer spacing of approximately 35 m $$\left(\frac{50 \text{ m}}{\sqrt{2}} \approx 35.3553391 \text{ m}\right)$$

for the third survey line 201, one ends up with a bin size of 6.25 m×6.25 m. Note that HD shooting would have to go to a streamer spacing of 25 m to achieve the same bin size of 6.25 m×6.25 m.

A third embodiment of the method of the invention employs four-azimuth cascaded orthogonal shooting, which is a form of regular four-azimuth MATS shooting. The first three survey lines are the two orthogonal survey lines and the one diagonal survey line shot in the three-azimuth cascaded orthogonal shooting discussed above with reference to FIG. 2. A fourth survey line is shot in a fourth direction diagonal to the first survey line and the second survey line, but in a different direction than the third survey line. Again, the fourth survey line has the same streamer spacing of approximately 70 m and receiver spacing of approximately 17.5 m as the third survey line does.

Figure 3:
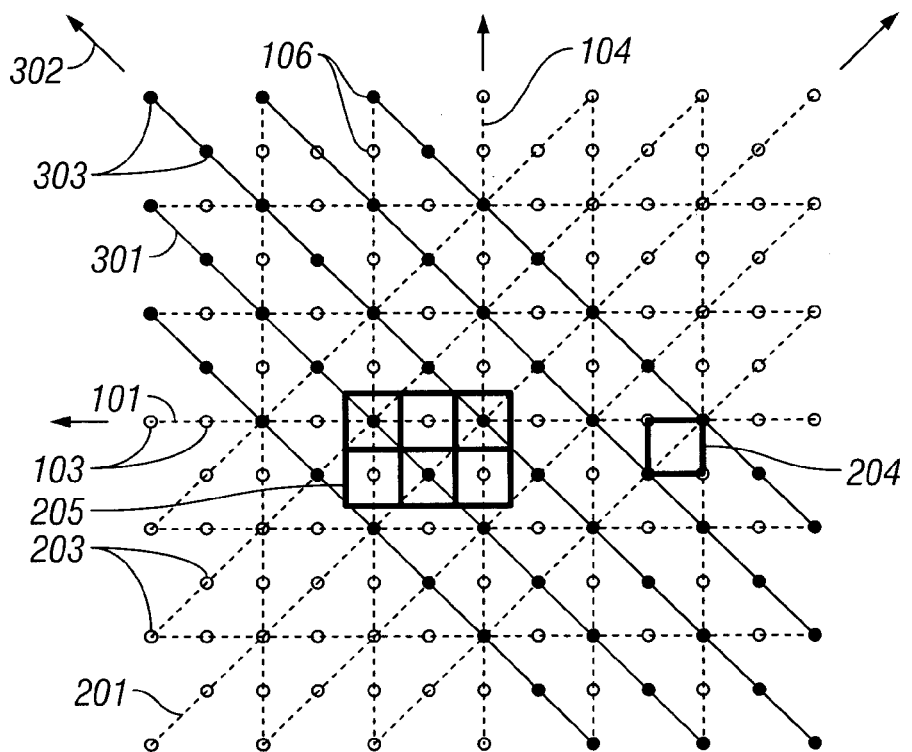
FIG. 3 is a diagram of the configuration of sampling points generated by four-azimuth cascaded orthogonal shooting.

FIG. 3 shows a diagram of the configuration of sampling points generated by four-azimuth cascaded orthogonal shooting. The sampling points 103 for the first survey line 101, the sampling points 106 for the second survey line 104 (from FIG. 1A) and the sampling points 203 for the third survey line 201 (from FIG. 2), are all now shown as open circles on dashed lines. The fourth survey line 301 is shown in a NW-SE direction 302; that is, traveling from the lower right to the upper left as depicted in FIG. 3. The sampling points 303 for the new survey line, the fourth survey line 301, are shown as filled circles on solid lines, to distinguish them from the previous survey lines, the first survey line 101, the second survey line 104, and the third survey line 201. Again, the method of the invention recognizes the alternative bin 205 with a bin size of 12.5 m×12.5 m shown in FIG. 3 in shifted position, centered about the sampling points, 103, 106, 203, 303. This embodiment of the invention yields the same bin size as the single direction HD shooting with the additional benefit of greatly improved illumination from now shooting in four azimuth directions.

A fourth embodiment of the method of the invention employs an alternative two-azimuth orthogonal shooting with a sparser configuration of sampling points than the two-azimuth orthogonal shooting discussed above with respect to FIGS. 1A and 1B. In this sparser shooting, all of the overlying sampling points, which constitute every other sampling point from both survey lines, are removed. Nevertheless, the same small bin with smaller bin size of approximately 17.5 m×17.5 m is obtained. Thus, the benefits of two-azimuth orthogonal shooting, improved illumination as well as improved spatial sampling density, can be obtained with half the spatial sampling density in the inline direction, leading to cost savings.

Figure 4:
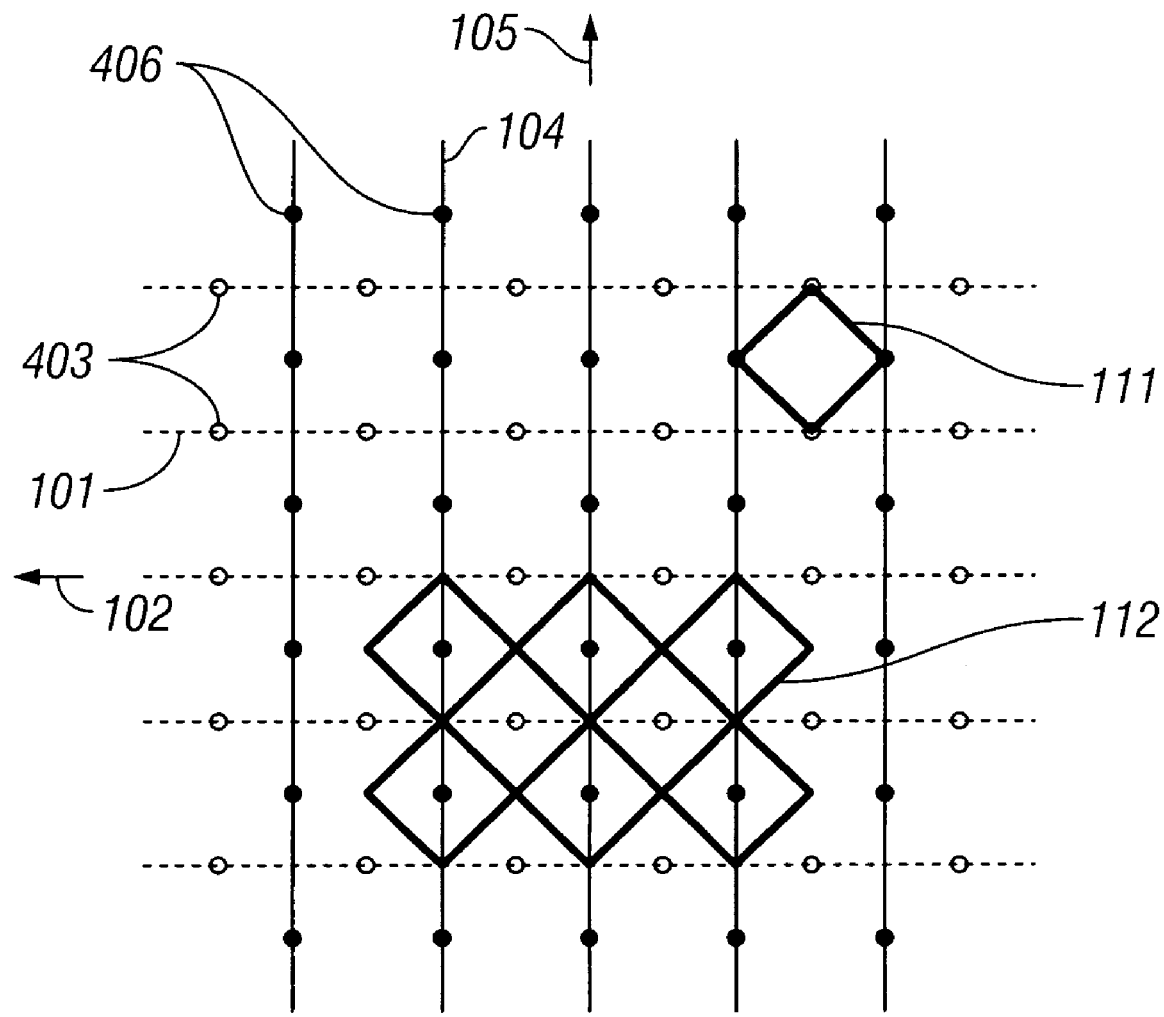
FIG. 4 is a diagram of the configuration of sampling points generated by two-azimuth interleaved orthogonal shooting.

FIG. 4 shows a diagram of the configuration of sampling points generated by the alternative sparser two-azimuth orthogonal shooting. The first survey line 101 is shown in a W-E direction 102, as in FIG. 1A. The new sampling points 403 for the first survey line 101 are shown as open circles on dashed lines. The second survey line 104 is shown orthogonal to the first survey line 101 in a N-S direction 105, also as in FIG. 1A. The new sampling points 406 for the second survey line 104 are shown as filled circles on solid lines. The sampling points 403 on the first survey line 101 and the sampling points 406 on the second survey line 104 do not overlie each other anywhere. The same small alternative bin 111 with a bin size of approximately 17.5 m×17.5 m, is obtained with half the sampling points. As above, the bin grid would be defined with bin 111 shifted to bins 112, centered on the sampling points 403, 406.

A fifth embodiment of the method of the invention employs three-azimuth equilateral triangular shooting, also known as hexagonal shooting, which is regular three-azimuth MATS shooting. A first survey line is shot in a first direction, as in a conventional single-direction shooting. A second survey line and a third survey line are shot in directions (azimuths) at 60° and 120°, respectively, relative to the first survey line. The spacing between the streamers for the second and third survey lines is the same as for the first survey line. To have the sampling points line up in a regular pattern, while maintaining a receiver spacing of 25 m, the spacing between the streamers is approximately 86.5 m for all three survey lines. For both practical and illustrative purposes, the streamer spacing is referred to as 86.5 m, although theoretically the spacing is $$\frac{100\sqrt{3} \text{ m}}{2} \approx 86.60254038 \text{ m}.$$

Lining up the sampling points from the three surveys so that they overlie each other in a regular pattern can be accomplished by interpolation of the values recorded at the existing receiver positions.

Figure 5A:
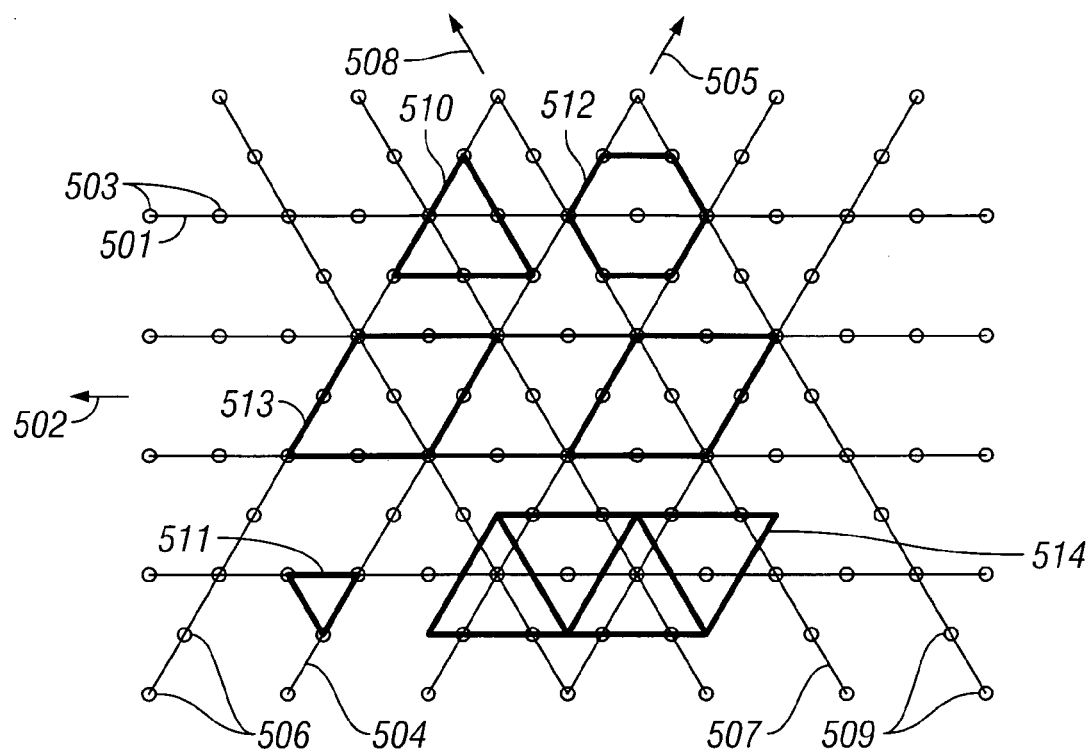
FIGS. 5A and 5B are diagrams of the configuration of sampling points generated by three-azimuth equilateral triangular shooting.
Figure 5B:
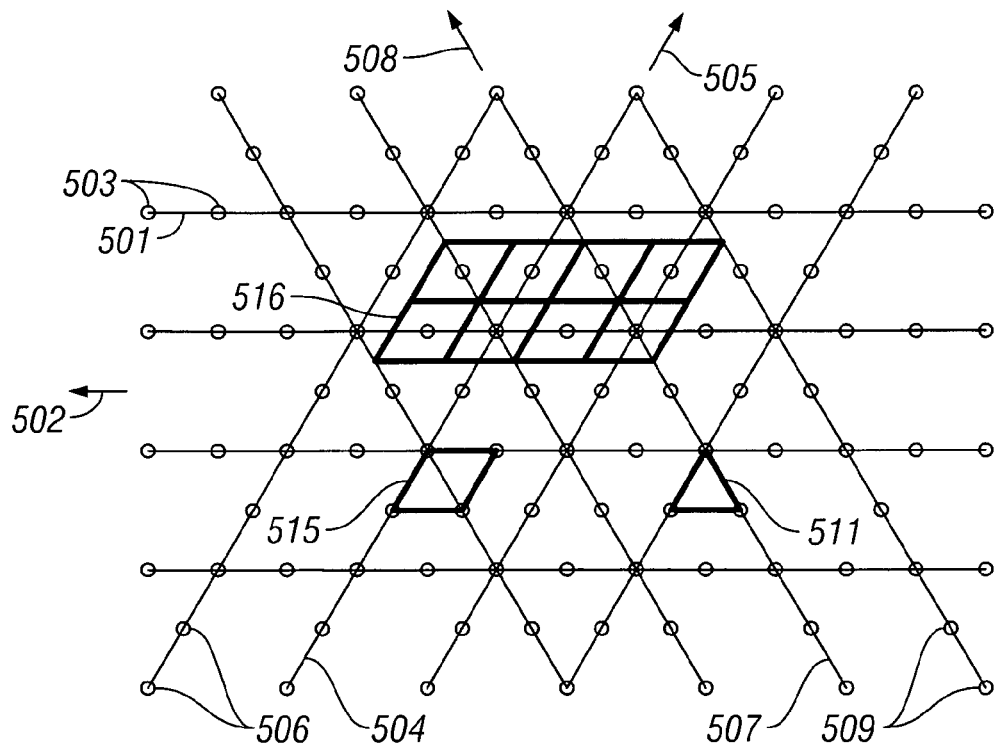

FIGS. 5A and 5B show diagrams of the configuration of sampling points generated by three-azimuth equilateral triangular shooting. In FIG. 5A, the first survey line 501 is shown in a W-E direction 502, as in FIG. 1A. The sampling points 503 for the first survey line 501 are shown as open circles on solid lines. The second survey line 504 is shown in a direction 505 that is at an angle of 60° relative to the first survey line 501. The sampling points 506 for the second survey line 504 are also shown as open circles on solid lines. These sampling points 506 for the second survey line 504 are not the same sampling points that would be acquired directly from the seismic acquisition. Instead, these sampling points 506 are determined by interpolation. The positions of the sampling points 506 in the second survey line 504 may not line up naturally, but are systematically shifted between different survey lines. In particular, the interpolation of the acquired sampling points is designed with one half of a sampling interval shift between adjacent survey lines. The same sampling interval as used in the first survey line 501, 12.5 m in this case, should be employed for all survey lines to maintain the same survey resolution. The third survey line 507 is shown in a direction 508 that is at an angle of 120° relative to the first survey line 501. The sampling points 509 for the third survey line 507 are also shown as open circles on solid lines. The sampling points 509 for the third survey line 507 are also obtained by interpolation, as discussed above for the second survey line 504.

The shooting pattern illustrated in FIG. 5A is called equilateral triangular because of the larger and smaller equilateral triangles, such as indicated by reference numerals 510 and 511, respectively, that show up in the pattern of sampling points. The shooting pattern is also called hexagonal because of the hexagons 512 that show up in the pattern of sampling points.

Here, in the case discussed with regard to FIGS. 5A and 5B, the streamers are again configured as in the conventional streamer configuration described above. However, to achieve a conventional bin size of 25 m×25 m, the streamers are approximately 86.5 m apart for all three survey lines, the receivers are spaced 12.5 m apart, and two seismic sources are spaced 50 m apart. Conventional seismic data processing would define bins 510, 513 with a bin size of 25 m×25 m. As above, the bin grid would be defined with bins 510 shifted to bins 514 centered on the sampling points 503, 506, 509. The bins 513 are already centered on the sampling points 503, 506, 509. In FIG. 5B, the method of the invention recognizes an alternative smaller bin 515 with a bin size of 12.5 m×12.5 m, and also shown as bins 516 in shifted position, centered about the sampling points, 503, 506, 509. The method of the invention can also recognize the smaller triangle 511 as another alternative smaller bin, although a shifted version cannot be obtained directly from the sampling points of the acquisition. The shifted points would be generated from the interpolation process discussed above with regard to FIG. 5A, with the systematic shift of the sampling points between the second and third survey lines. The alternative bins 511, 515 have half the linear bin dimensions as the conventional bins 510, 513 (shown in FIG. 5A), the same smaller size as the bin found in HD, as well as the additional benefit of improved illumination from shooting in three azimuth directions. Thus, this embodiment of the invention, utilizing only three survey lines, provides both greatly improved illumination and the same improved spatial sampling density as HD, for only approximately 1½ times the cost as HD.

Through the method of the invention, regular MATS shooting provides data quality improvement in both illumination (more azimuths) and spatial sampling (smaller bin size), while irregular MATS shooting provides illumination improvement only. Therefore, regular MATS shooting provides a more balanced approach between HD, which provides mainly bin-size improvement, and irregular MATS shooting which provides mainly illumination improvement. Further, regular MATS shooting can achieve a very small bin-size (for example, 6.25 m×6.25 m) using a normal 50 m streamer separation instead of the more difficult 25 m streamer separation needed by HD. Thus, regular MATS shooting according to the method of the invention can greatly relax the streamer separation requirement for achieving the same small bin-size as HD.

As shown in FIGS. 1B and 4, two surveys shot orthogonally with a 25 m bin size, can be binned on a 17.5 m grid with a bin grid orientation rotated 45° relative to the previous shooting directions. This shooting pattern and subsequent binning leads to less aliasing, and modeling was performed in order to test this. The results of the modeling are discussed below with reference to FIGS. 6 through 13B.

Figure 6:
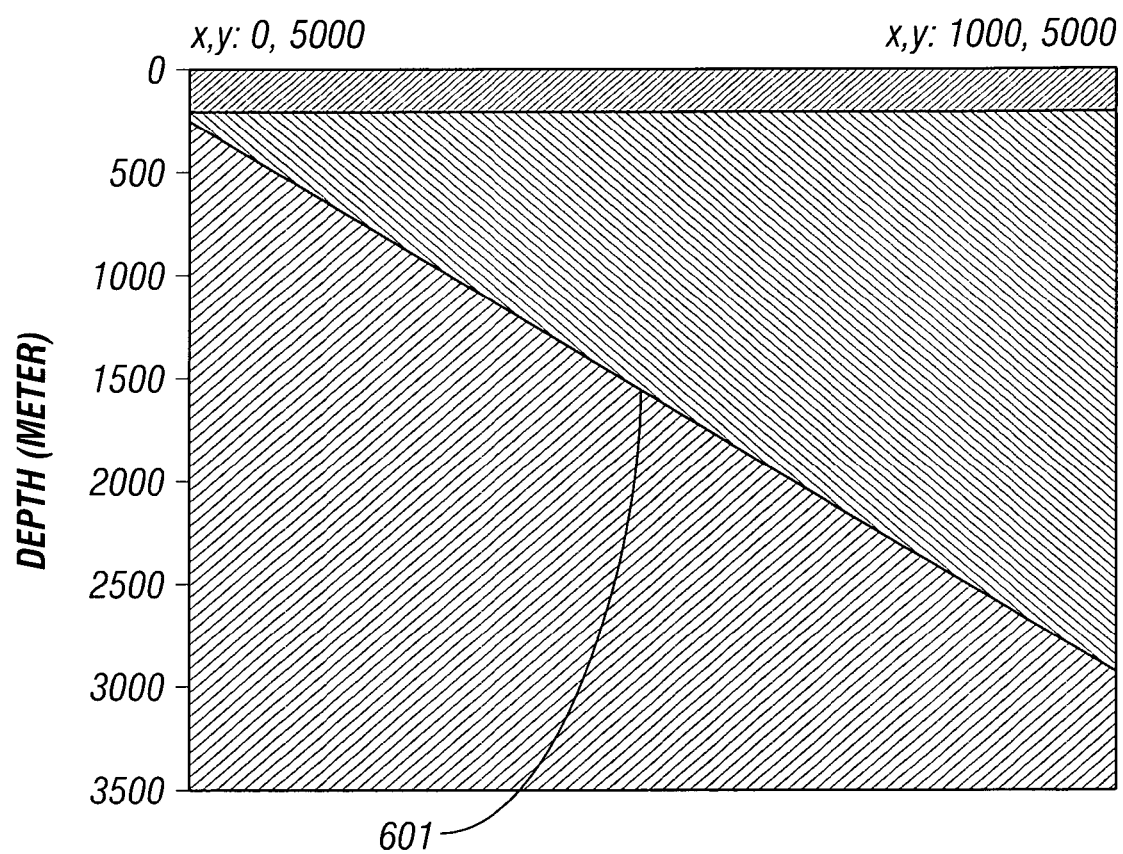
FIG. 6 shows a model with a 15° dip in the East-West direction.
Figure 7:
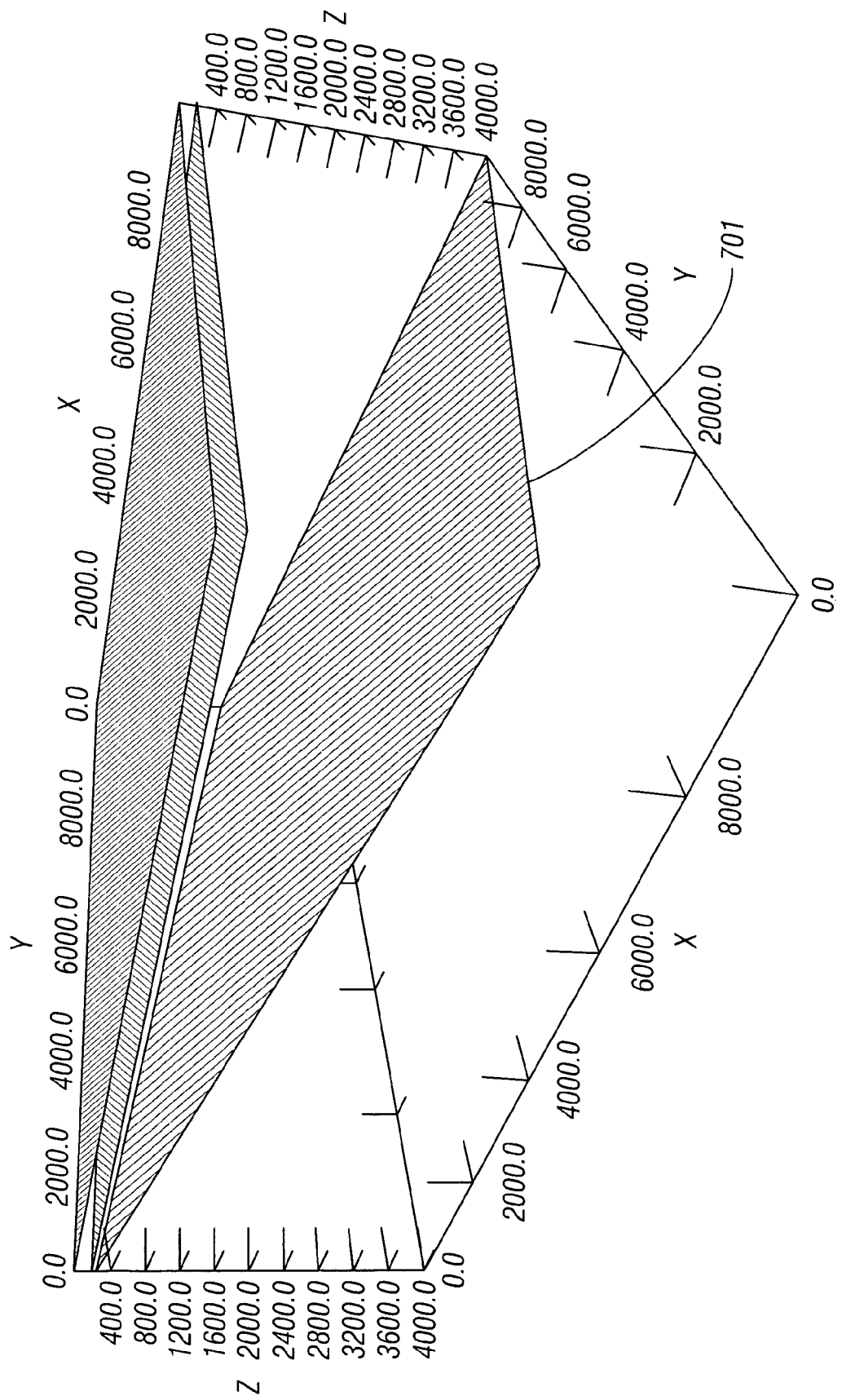
FIG. 7 shows a model with a 15° dip relative to North-East.
Figure 8:
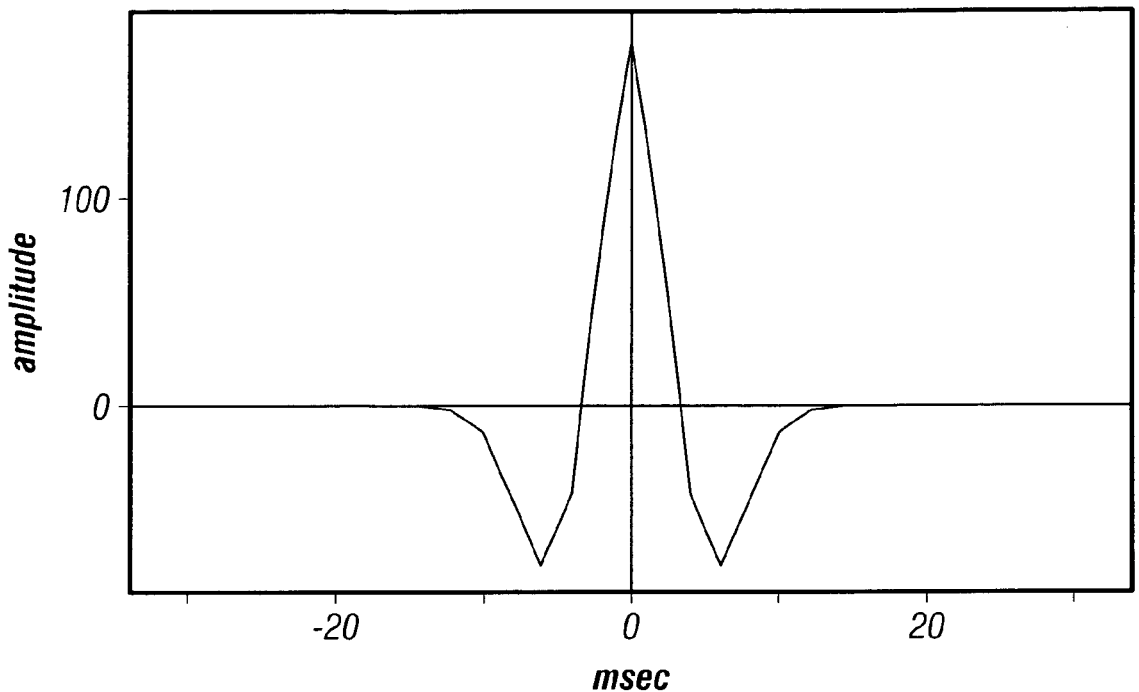
FIG. 8 shows a Ricker wavelet used in the modeling.
Figure 9:
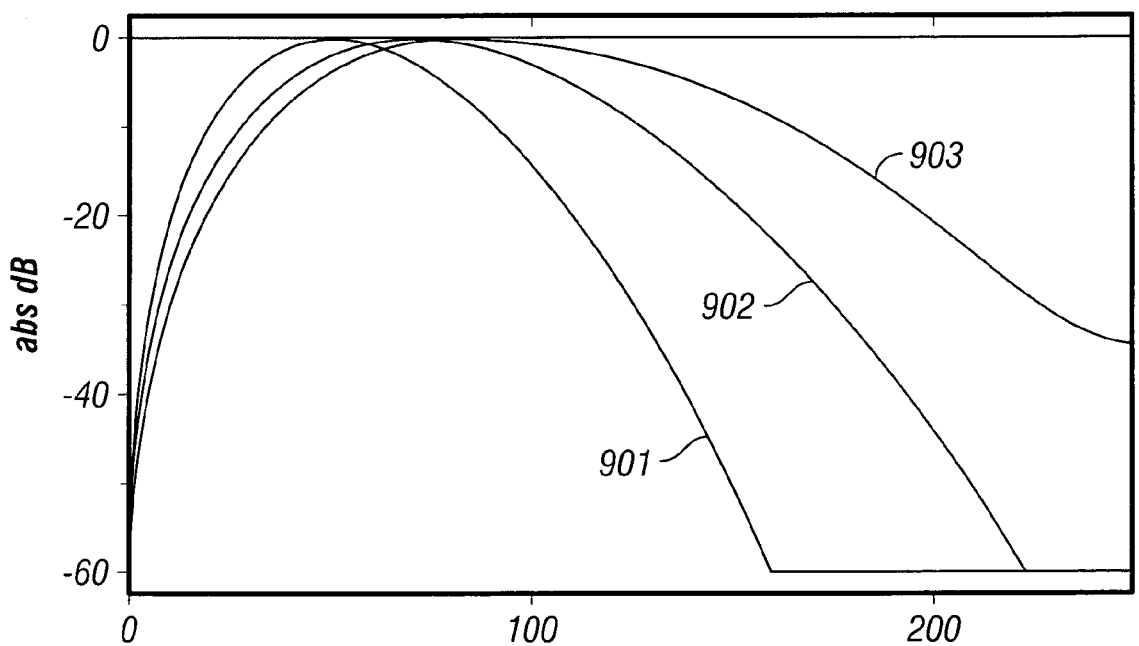
FIG. 9 shows the corresponding frequency spectra of the 50 Hz, 70 Hz, and 90 Hz Ricker wavelets used in the modeling.

FIGS. 6 and 7 show the two 3D models that were used in the modeling. In order to generate a comparison between the 25 m and 17.5 m bin sizes, two models were generated, both with a 15° dipping target. FIG. 6 shows a model with a 15° dip 601 in the East-West direction, while FIG. 7 shows a model with a 15° dip 701 relative to North-East. Three different simple Ricker wavelets, with central frequencies of 50 Hz, 70 Hz, and 90 Hz, were used in the modeling. FIG. 8 shows a Ricker wavelet used in the modeling and FIG. 9 shows the corresponding frequency spectra of the 50 Hz, 70 Hz, and 90 Hz Ricker wavelets (reference numerals 901, 902, and 903, respectively) used in the modeling. The different frequency bandwidths were selected in order to investigate a gradual increase in the amount of aliasing.

Figure 10:
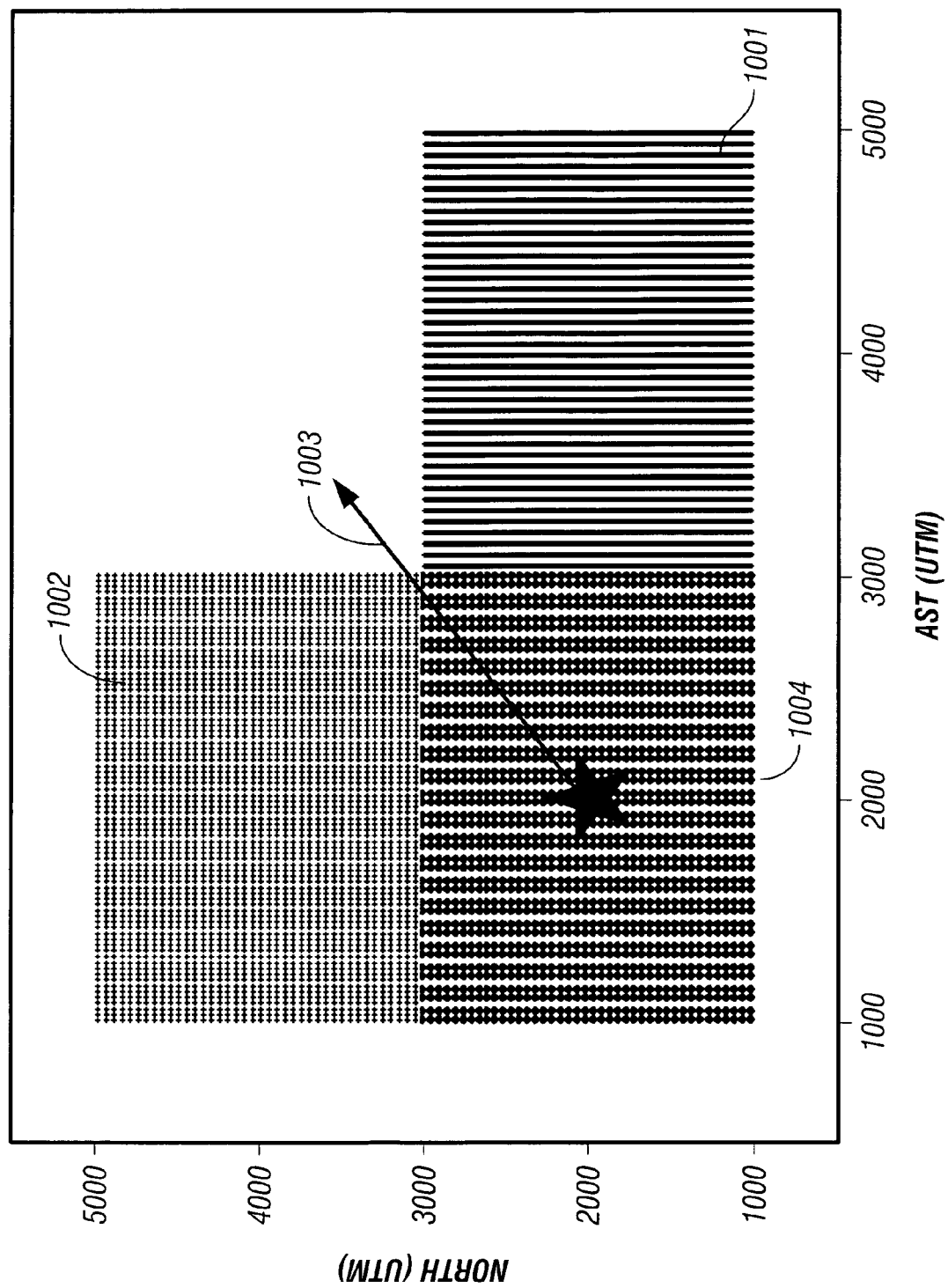
FIG. 10 shows the layout of the two orthogonal surveys combined in the modeling.

FIG. 10 shows the layout of the surveys. Two orthogonal surveys with 25 m×25 m bin size were generated. The surveys were in the East-West 1001 and North-South 1002 shooting directions. These surveys were combined in the modeling software in order to generate one survey with a 17.5 m×17.5 m bin size rotated 45° relative to the original binning directions. The direction for the binning of the multi-azimuth survey is 45° from North. The orientation (analogous to the inline direction) of the new bin grid is marked with the arrow 1003 in FIG. 10. The point for the analysis described below is marked with the star 1004 in FIG. 10.

True Amplitude Pre-Stack Time Migrated (TAPSTM) stacked responses were generated to investigate the spatial aliasing. FIGS. 11A through 13B show the TAPSTM stacked response with 25 m and 17.5 m for 50 Hz, 70 Hz, and 90 Hz Ricker wavelets.

Figure 11A:
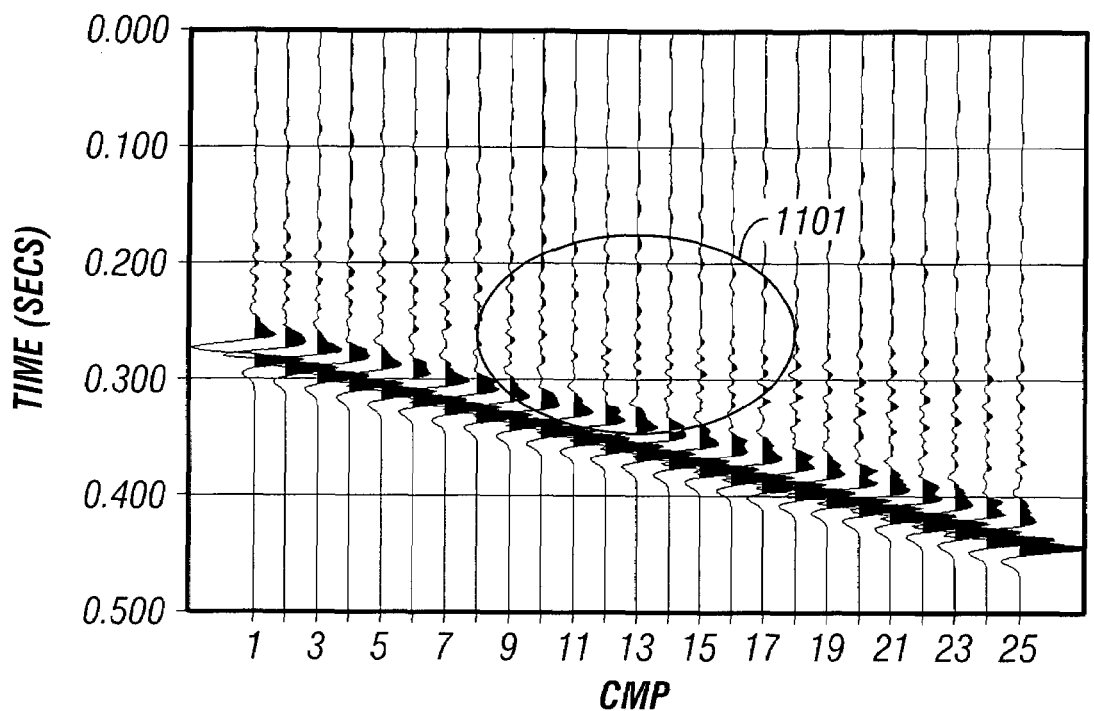
FIGS. 11A and 11B show the results of stack responses with TAPSTM (True Amplitude Pre-Stack Time Migration) for 25 m and 17.5 m trace distances, respectively, using the 50 Hz Ricker wavelet in the modeling.
Figure 11B:
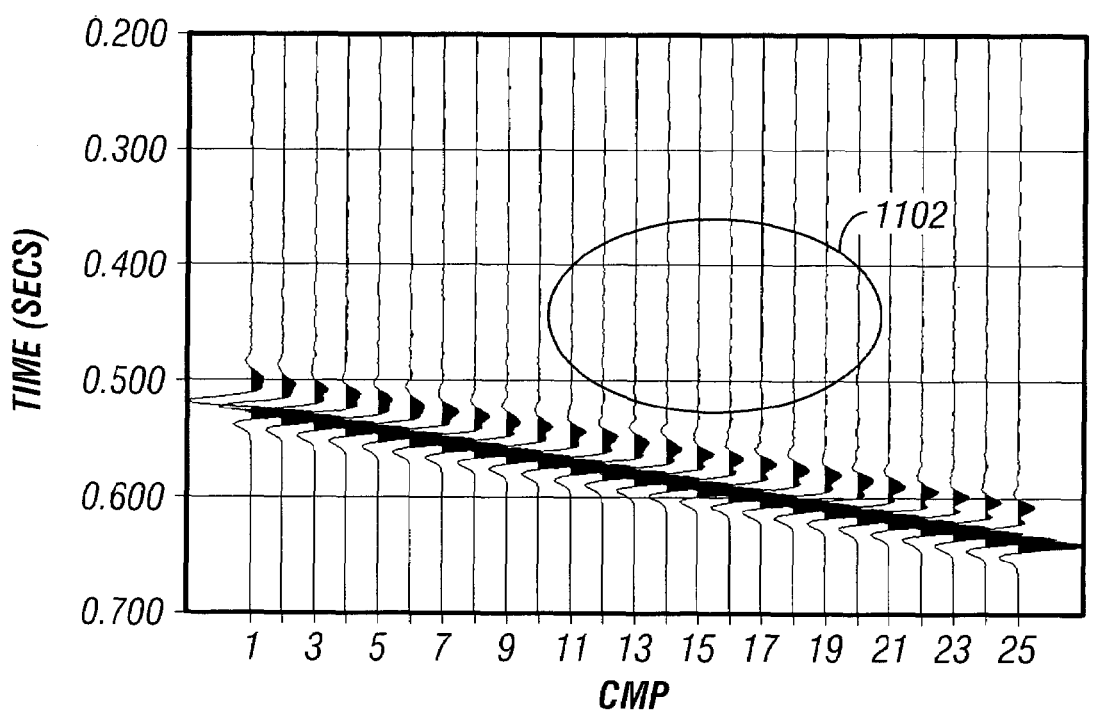

FIGS. 11A and 11B show the results of TAPSTM stacks for 25 m and 17.5 m trace distances, respectively, using 50 Hz Ricker wavelet in the modeling. In both figures, the dip in the direction of the stack is 15°. The stack with the 25 m trace distance in FIG. 11A has a more aliased signal than the stack with 17.5 m trace distance in FIG. 11B. Noise due to aliasing is marked with the circles 1101, 1102 in the figures.

Figure 12A:
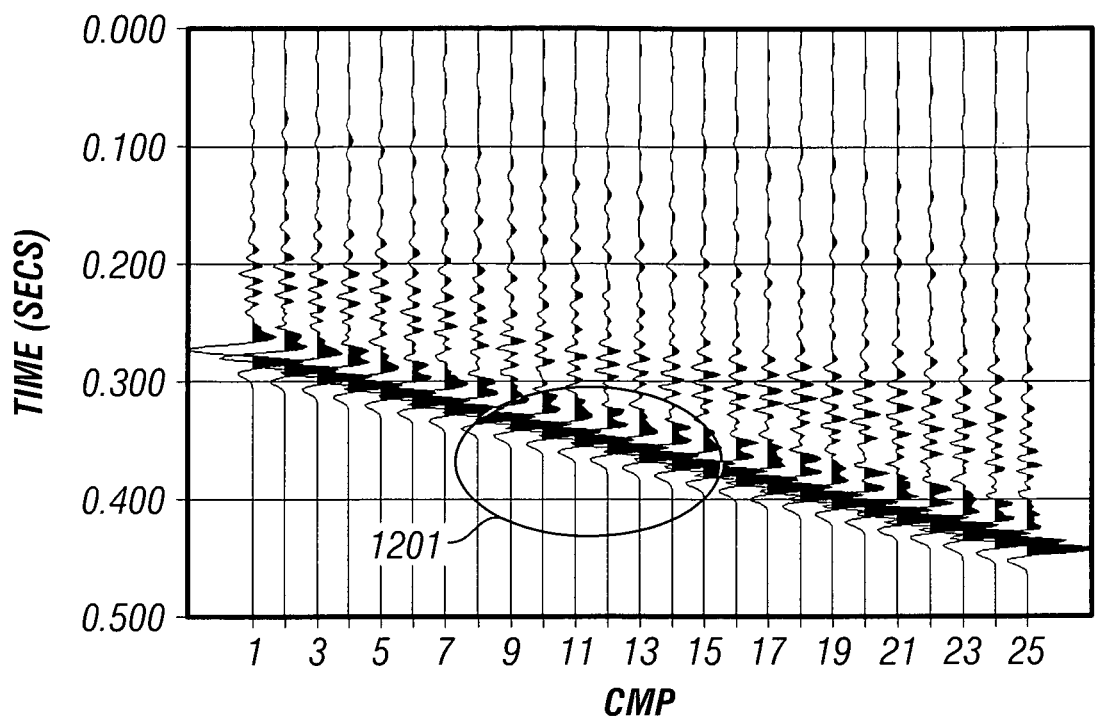
FIGS. 12A and 12B show the results of stack responses with TAPSTM for 25 m and 17.5 m trace distances, respectively, using the 70 Hz Ricker wavelet in the modeling.
Figure 12B:
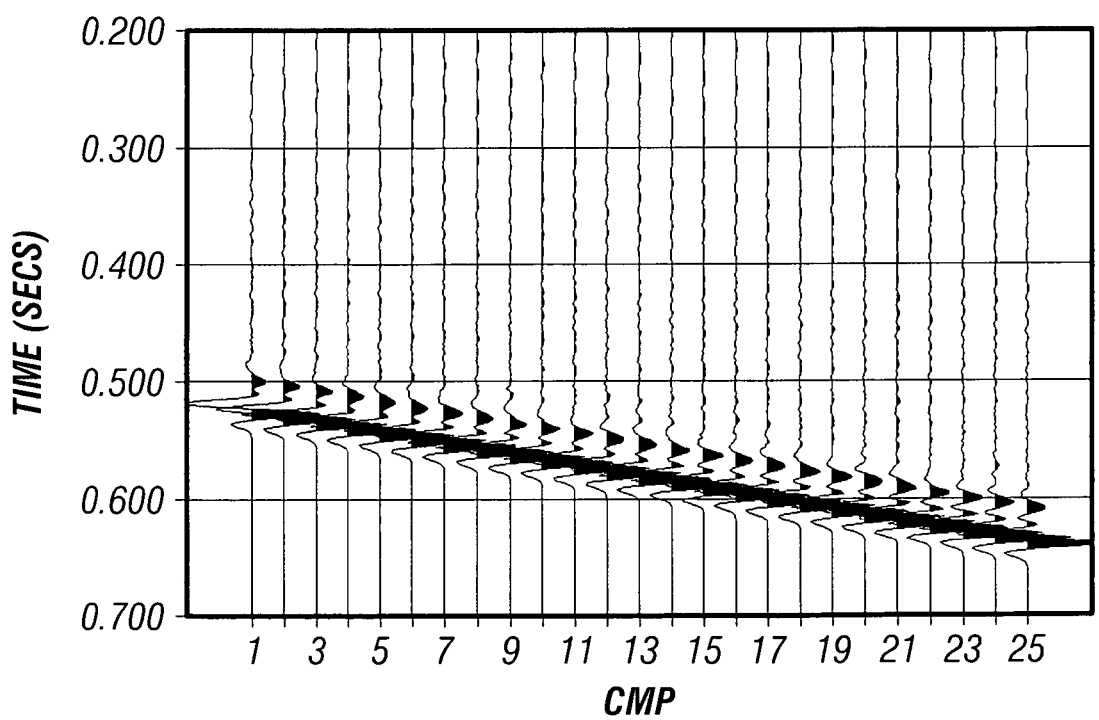

FIGS. 12A and 12B show the results of TAPSTM stacks for 25 m and 17.5 m trace distances, respectively, using the 70 Hz Ricker wavelet in the modeling. In both cases, the dip in the direction of the stack is 15°. The wavelet is more distorted due to aliasing with the 25 m trace distance, marked with the circle 1201 in FIG. 12A.

Figure 13A:
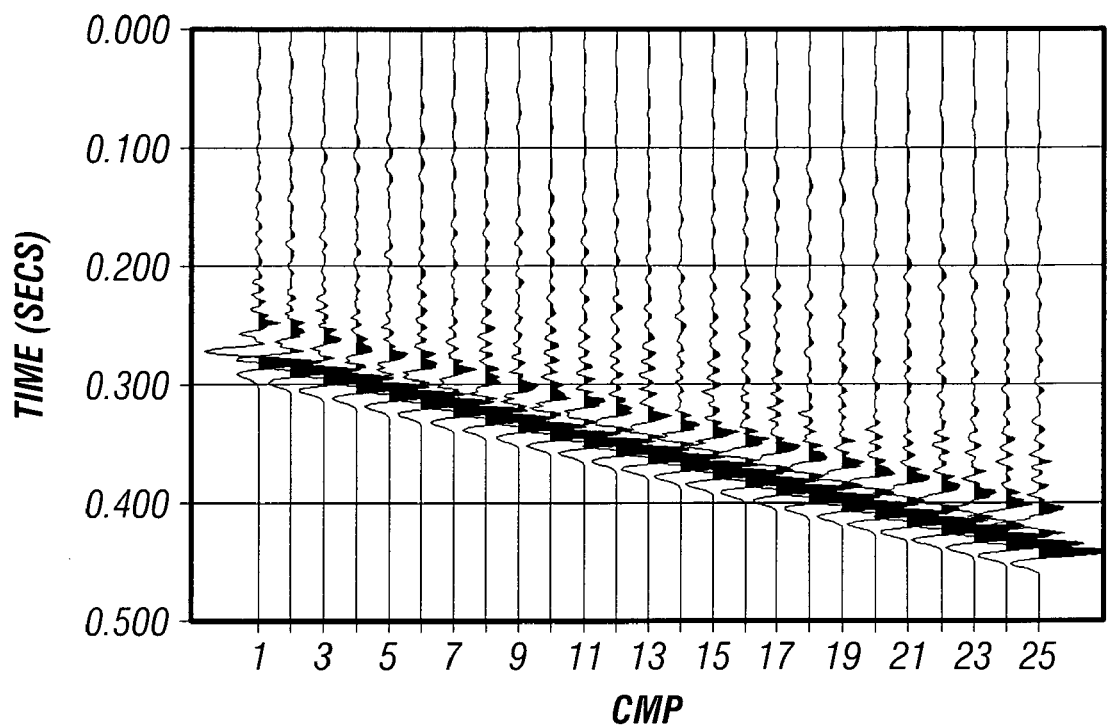
FIGS. 13A and 13B show the results of stack responses with TAPSTM for 25 m and 17.5 m trace distances, respectively, using the 90 Hz Ricker wavelet in the modeling.
Figure 13B:
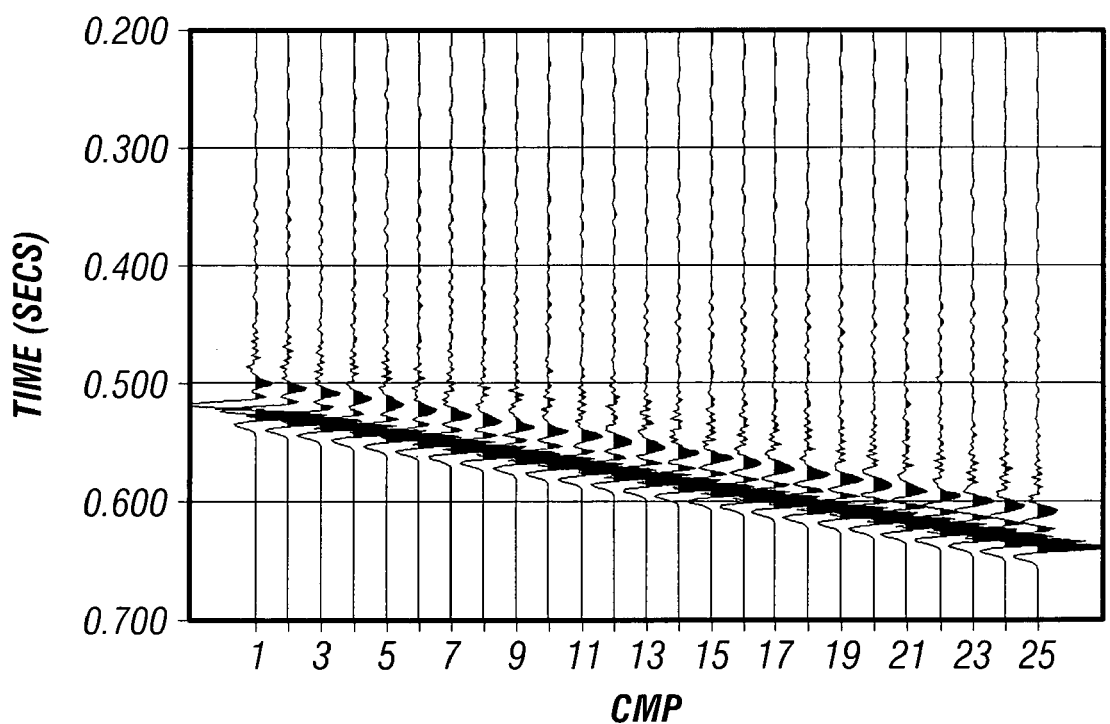

FIGS. 13A and 13B show the results of TAPSTM stacks for 25 m and 17.5 m trace distances, respectively, using the 90 Hz Ricker wavelet in the modeling. In both cases, the dip in the direction of the stack is 15°. It can also be seen that the stack contains more aliasing when the frequency content is increased by using 50 Hz, 70 Hz, and 90 Hz Ricker wavelets. The aliasing is manifested in the stacks by increased noise and through a distortion of the wavelet.

Figure 14:
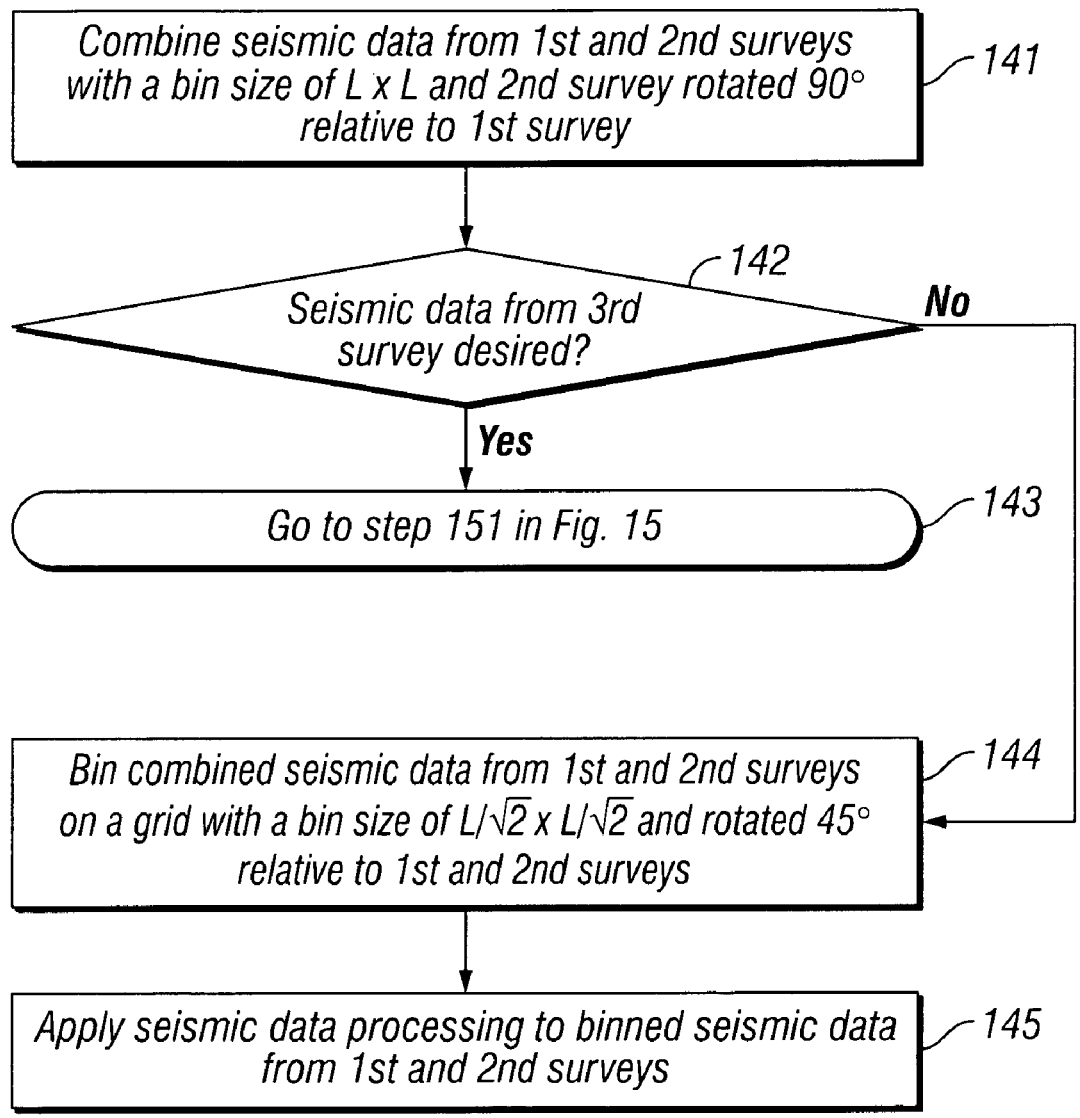
FIG. 14 is a flowchart illustrating the processing steps of an embodiment of the method of the invention for processing marine towed streamer seismic data from two regular multi-azimuth surveys.
Figure 15:
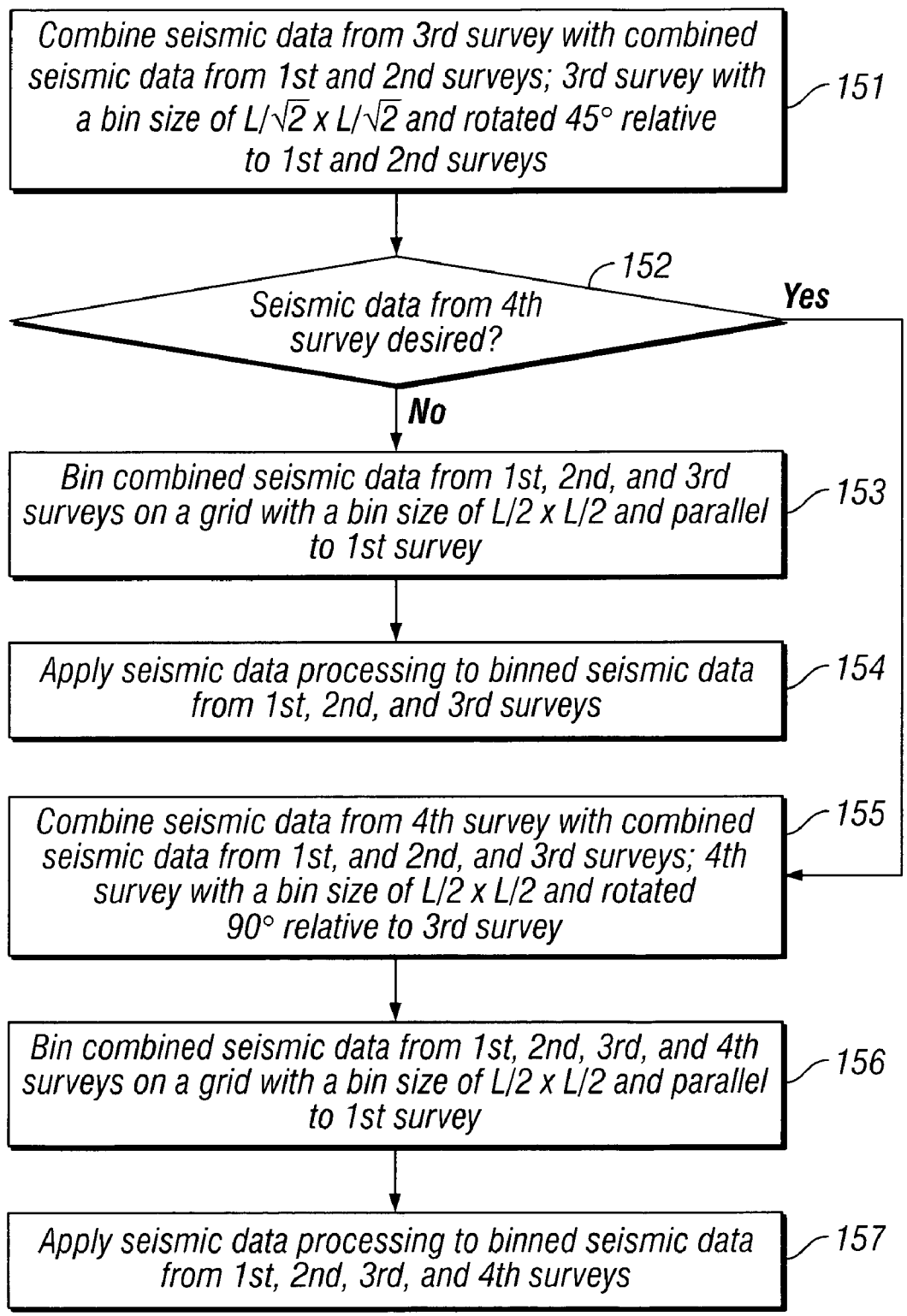
FIG. 15 is a flowchart illustrating the processing steps of an embodiment of the method of the invention for processing marine towed streamer seismic data from one or two additional regular cascaded surveys.

FIG. 14 shows a flowchart illustrating the processing steps of an embodiment of the method of the invention for processing marine towed streamer seismic data from two regular multi-azimuth surveys. FIG. 14 illustrates the basic case utilizing two-azimuth orthogonal shooting, (regular two-azimuth MATS shooting), as discussed above in regard to FIGS. 1A and 1B. FIG. 15, following, illustrates the further case utilizing one or two additional cascaded regular surveys, as discussed above with regard to FIGS. 2 and 3.

First, at step 141, seismic data from a first survey and a second survey are combined. The first survey and the second survey are shot with a bin size of L×L and the second survey is shot with a shooting direction rotated 90° relative to the shooting direction of the first survey. The bin size parameter L would correspond to 25 m in the example employed in the discussion above with regard to FIGS. 1A and 1B.

At step 142, it is determined if it is desired to add one or two additional cascaded regular surveys to the first and second surveys before combining the seismic data. If the answer is yes, further survey data is desired, then the process continues to step 143. If the answer is no, no further survey data is desired, then the process continues to step 144.

At step 143, the process leaves FIG. 14 and proceeds to step 151 in FIG. 15 to add one or two additional cascaded regular surveys to the first and second surveys before combining the seismic data.

At step 144, the combined seismic data from the first and second surveys from step 141 are binned on a bin grid with a bin size of $$\frac{L}{\sqrt{2}} \times \frac{L}{\sqrt{2}}$$

and with a bin grid orientation rotated 45° relative to the shooting directions of the first and second surveys.

At step 145, seismic data processing is applied to the binned seismic data from step 144 to create an image of Earth's subsurface.

FIG. 15 shows a flowchart illustrating the processing steps of an embodiment of the method of the invention for processing marine towed streamer seismic data from one or two additional cascaded regular surveys beyond the first two surveys utilized in FIG. 14. FIG. 15 illustrates the case utilizing three- or four-azimuth cascaded orthogonal shooting (regular three- or four-azimuth MATS shooting). The steps in FIG. 15 serve as additional steps beyond step 141 in FIG. 14.

First, at step 151, seismic data from a third survey are combined with the combined seismic data from the first and second surveys from step 141 in FIG. 14. The third survey is shot with a bin size of $$\frac{L}{\sqrt{2}} \times \frac{L}{\sqrt{2}}$$

and with a shooting direction rotated 45° relative to the shooting directions of the first and second surveys. The bin size parameter L would correspond to 25 m in the example employed in the discussion above with regard to FIGS. 2 and 3.

At step 152, it is determined if it is desired to add an additional fourth cascaded regular survey to the first, second, and third surveys before combining the seismic data. If the answer is yes, further survey data is desired, then the process continues to step 155. If the answer is no, no further survey data is desired, then the process continues to step 153.

At step 153, the combined seismic data from the first, second, and third surveys from step 151 are binned on a bin grid with a bin size of $$\frac{L}{2} \times \frac{L}{2}$$

and with a bin grid orientation parallel to the shooting direction of the first survey.

At step 154, seismic data processing is applied to the binned seismic data from step 153 to create an image of the Earth's subsurface.

At step 155, seismic data from a fourth survey are combined with the combined seismic data from the first, second, and third surveys from step 151. The fourth survey is shot with a bin size of $$\frac{L}{\sqrt{2}} \times \frac{L}{\sqrt{2}}$$

and with a shooting direction rotated 90° relative to the shooting directions of the third survey.

At step 156, the combined seismic data from the first, second, third, and fourth surveys from step 153 are binned on a bin grid with a bin size of $$\frac{L}{2} \times \frac{L}{2}$$

and with a bin grid orientation parallel to the shooting direction of the first survey.

At step 157, seismic data processing is applied to the binned seismic data from step 156 to create an image of the Earth's subsurface.

Figure 16:
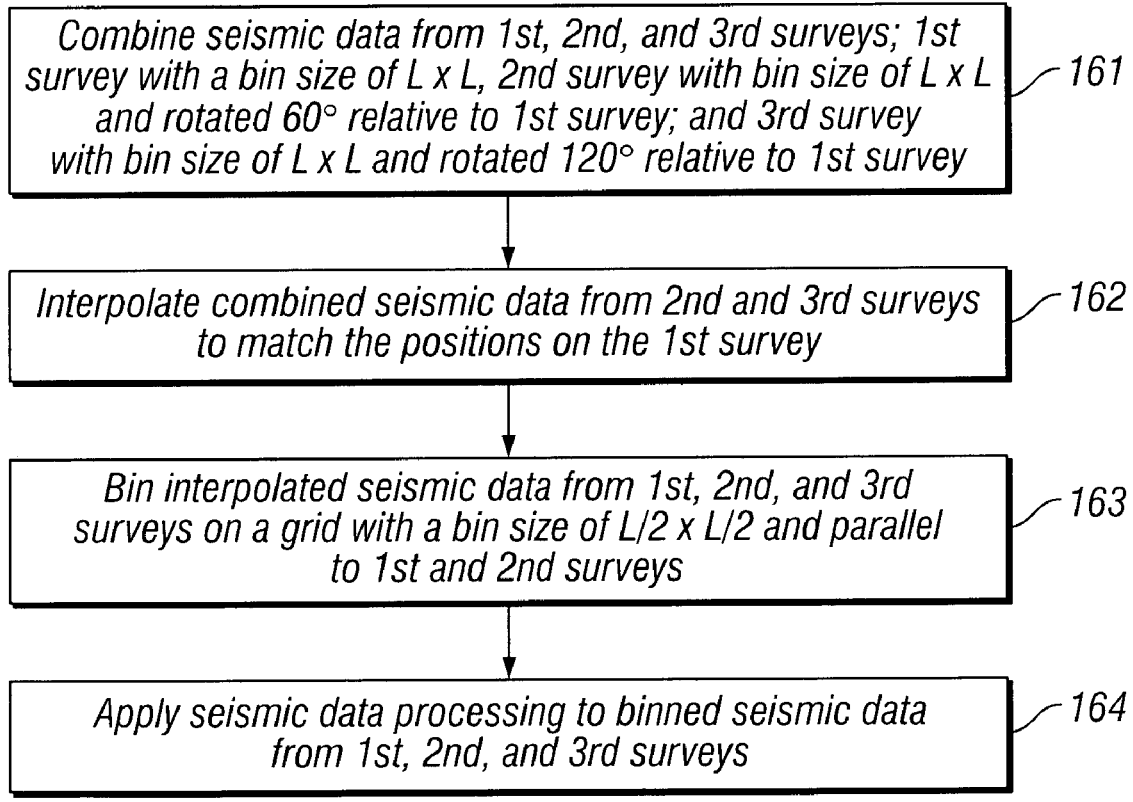
FIG. 16 shows a flowchart illustrating the processing steps of an embodiment of the method of the invention for processing marine towed streamer seismic data from three regular multi-azimuth surveys.

FIG. 16 shows a flowchart illustrating the processing steps of an embodiment of the method of the invention for processing marine towed streamer seismic data from three regular multi-azimuth surveys.

First, at step 161, seismic data from a first survey, a second survey, and a third survey are combined. The first, second and third surveys are shot with a bin size of L×L. The second survey is shot with a shooting direction rotated 60° relative to the shooting direction of the first survey. The third survey is shot with a shooting direction rotated 120° relative to the shooting direction of the first survey. The bin size parameter L would correspond to 25 m in the example employed in the discussion above with regard to FIGS. 5A and 5B.

At step 162, the combined seismic data from the first, second, and third surveys from step 161 are interpolated according to the discussion above with regard to FIG. 5A. In particular, the seismic data from the second and third surveys are interpolated to match the positions of the first survey.

At step 163, the interpolated seismic data from step 162 are binned on a bin grid with a bin size of $$\frac{L}{2} \times \frac{L}{2}$$

and with a bin grid orientation that is the same as the shooting direction of the first survey, as discussed above with regard to FIG. 5B.

At step 164, seismic data processing is applied to the binned seismic data from step 163.

To process the 3D data acquired by MATS shooting, interpolation processing needs to be applied in some steps. For any multi-azimuth application it is especially important to use all azimuth information. Hence for each grid point of the original and the new grid, neighboring values may need to be integrated from different azimuths. Regular shooting, such as orthogonal shooting, provides a uniform and simpler sampling pattern than an arbitrary multi-azimuth shooting, so the interpolation process can be greatly simplified or even avoided. For instance, in a basic version, values at the grid points can be summed directly without interpolation. This will greatly simplify and reduce the multi-azimuth processing. The interpolation step can be realized in either pre-stack or post-stack mode, although interpolation will be much more efficient in the post-stack mode.

When designing any new 3D shooting with a certain budget, the options may include orthogonal shooting, non-orthogonal shooting, or HD shooting. In general, non-orthogonal shooting will yield improved illumination and HD shooting will yield improve spatial resolution, while the method of the invention will enable orthogonal shooting to provide a better balance than the other choices between improved spatial resolution and improved illumination.

Often, a new 3D survey needs to be shot where a 3D survey already exists. In contrast to repeated 3D (i.e., 4D), a non-repeated 3D strategy is required if an improvement in the seismic image, compared to the existing data, is desired. Then an advantageous strategy may be to acquire a new survey differently than the existing survey, so that more and new information can be extracted from the same location. A benefit of the invention is that the original 3D survey may be considered as the first azimuth and the new survey may be considered as the second azimuth to form an orthogonal shooting pattern, as illustrated in the discussion with regard to FIGS. 1A and 1B, above. For example, an original dip shooting may be followed by a new strike shooting or vice versa. By using the orthogonal shooting method in such scenario, both illumination improvement (adding one azimuth) and spatial sampling improvement (a square root 2 factor) can be achieved by shooting a new conventional 3D.

To improve spatial sampling in the cross-line direction, a 50 m and 37.5 m streamer separation has been applied in industry for years. It would be advantageous to achieve 25 m streamer separation and smaller. The method of the invention provides an alternative approach for achieving the higher spatial resolution possible with smaller streamer spacing. Every time one azimuth orthogonal to the original one is added, the method of the invention can increase the spatial sampling rate by a factor of the square root of 2, as described above. Therefore, by doing regular MATS shooting not only can illumination improvement be achieved, but a higher spatial sampling rate can be achieved also, while keeping a relatively larger streamer separation. For example, achieving a 6.25 m×6.25 m spatial sampling and resolution may not be realized with a 25 m separation using HD, but can be achieved with a 50 m or 37.5 m separation using cascaded orthogonal shootings as described above with reference to FIGS. 2 and 3.

Cascaded orthogonal shooting should be applied for shooting azimuths beyond two, as discussed above with reference to FIGS. 2 and 3. For the three azimuth case, only a single direction shooting, diagonal to the original orthogonal shooting grid, is needed. For the four azimuth case, a cascaded orthogonal shooting, in diagonal direction of the original orthogonal shooting, should be applied. By doing this, a 12.5 m×12.5 m bin size can be achieved with normal 100 m separation and a 6.25 m×6.25 m bin size can be achieved with 50 m separation, for either three and four azimuths.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for providing a seismic image of earth's subsurface, comprising:

retrieving seismic data representative of earth's subsurface and acquired by deploying a plurality of seismic sensors proximate an area of the earth's subsurface to be evaluated, the seismic sensors generating at least one of an electrical and optical signal in response to seismic energy, from a first survey and a second survey, wherein the first survey and the second survey are shot with a bin size of L×L and the second survey is shot with a shooting direction rotated 90° relative to the shooting direction of the first survey;

transforming the seismic data into binned seismic data with a higher resolution bin grid, comprising:
combining the seismic data from the first and second surveys; and
binning the combined seismic data from the first and second surveys on a bin grid with a bin size of $$\frac{L}{\sqrt{2}} \times \frac{L}{\sqrt{2}}$$

and with a bin grid orientation rotated 45° relative to the shooting directions of the first and second surveys; and applying seismic data processing to the binned seismic data to create a higher resolution image of the earth's subsurface.

2. A method for providing a seismic image of earth's subsurface, comprising:

retrieving seismic data representative of earth's subsurface and acquired by deploying a plurality of seismic sensors proximate an area of the earth's subsurface to be evaluated, the seismic sensors generating at least one of an electrical and optical signal in response to seismic energy, from a first survey, a second survey, and a third survey, wherein the first survey and the second survey are shot with a bin size of L×L, the second survey is shot with a shooting direction rotated 90° relative to the shooting direction of the first survey, and the third survey is shot with a bin size of $$\frac{L}{\sqrt{2}} \times \frac{L}{\sqrt{2}}$$

and with a shooting direction rotated 45° relative to the shooting directions of the first and second surveys;

transforming the seismic data into binned seismic data with a higher resolution bin grid, comprising:

combining the seismic data from the first, second, and third surveys; and binning the combined seismic data from the first, second, and third surveys on a bin grid with a bin size of $$\frac{L}{2} \times \frac{L}{2}$$

and with a bin grid orientation parallel to the shooting direction of the first survey; and applying seismic data processing to the binned seismic data to create a higher resolution image of the earth's subsurface.

3. The method of claim 2, wherein sampling points in the third survey are interpolated so that resulting sampling points overlie sampling points in the first and second surveys.

4. The method of claim 3, wherein the sampling points in the third survey are interpolated so that streamer spacing and receiver spacing are both decreased by a factor of $$\frac{1}{\sqrt{2}}$$

with respect to streamer spacing and receiver spacing, respectively, in the first and second surveys.

5. A method for providing a seismic image of earth's subsurface, comprising:

retrieving seismic data representative of earth's subsurface and acquired by deploying a plurality of seismic sensors proximate an area of the earth's subsurface to be evaluated, the seismic sensors generating at least one of an electrical and optical signal in response to seismic energy, from a first survey, a second survey, a third survey, and a fourth survey, wherein the first survey and the second survey are shot with a bin size of L×L, the second survey is shot with a shooting direction rotated 90° relative to the shooting direction of the first survey, the third survey is shot with a bin size of $$\frac{L}{\sqrt{2}} \times \frac{L}{\sqrt{2}}$$

and with a shooting direction rotated 45° relative to the shooting directions of the first and second surveys, and the fourth survey is shot with a bin size of $$\frac{L}{\sqrt{2}} \times \frac{L}{\sqrt{2}}$$

and with a shooting direction rotated 90° relative to the shooting directions of the third survey;

transforming the seismic data into binned seismic data with a higher resolution bin grid, comprising:

combining the seismic data from the first, second, third and fourth surveys; and binning the combined seismic data from the first, second, third, and fourth surveys on a bin grid with a bin size of $$\frac{L}{2} \times \frac{L}{2}$$

and with a bin grid orientation parallel to the shooting direction of the first survey; and applying seismic data processing to the binned seismic data to create a higher resolution image of the earth's subsurface.

6. The method of claim 5, wherein sampling points in the fourth survey are interpolated so that resulting sampling points overlie sampling points in the first, second, and third surveys.

7. The method of claim 6, wherein the sampling points in the fourth survey are interpolated so that streamer spacing and receiver spacing are both decreased by a factor of $$\frac{1}{\sqrt{2}}$$

with respect to streamer spacing and receiver spacing, respectively, in the first and second surveys.

8. The method of claim 1, wherein sampling points in the first survey and sampling points in the second survey are interspaced so that sampling points of the first survey and sampling points of the second survey do not overlie each other.

9. A method for providing a seismic image of earth's subsurface, comprising:

retrieving seismic data representative of earth's subsurface and acquired by deploying a plurality of seismic sensors proximate an area of the earth's subsurface to be evaluated, the seismic sensors generating at least one of an electrical and optical signal in response to seismic energy, from a first survey, a second survey, and a third survey, wherein the first, second, and third surveys are shot with a bin size of L×L, the second survey is shot with a shooting direction rotated 60° relative to the shooting direction of the first survey, and the third survey is shot with a shooting direction rotated 120° relative to the shooting direction of the first survey;

transforming the seismic data into binned seismic data with a higher resolution bin grid, comprising:

combining the seismic data from the first, second, and third surveys; and binning the combined seismic data from the first, second, and third surveys on a bin grid with a bin size of $$\frac{L}{2} \times \frac{L}{2}$$

and with a bin grid orientation parallel to the shooting direction of the first survey; and applying seismic data processing to the binned seismic data to create a higher resolution image of the earth's subsurface.

10. The method of claim 9, wherein sampling points in the second and third surveys are interpolated so that resulting sampling points overlie sampling points in the first survey.

11. The method of claim 9, wherein streamer spacing in the first, second, and third surveys is $$\frac{L(\sqrt{3})}{2}.$$

12. The method of claim 11, wherein the streamer spacing is achieved by interpolation of the sampling points.

13. The method of claim 11, wherein the streamer spacing is achieved by physical spacing of the streamers.

14. A computer readable medium with a computer program stored thereon, the program having logic operable to cause a programmable computer to perform steps comprising:
retrieving seismic data representative of earth's subsurface from a first survey and a second survey, wherein the first survey and the second survey are shot with a bin size of L×L and the second survey is shot with a shooting direction rotated 90° relative to the shooting direction of the first survey;
transforming the seismic data into binned seismic data with a higher resolution bin grid, comprising:
combining the seismic data from the first and second surveys; and
binning the combined seismic data from the first and second surveys on a bin grid with a bin size of $$\frac{L}{\sqrt{2}} \times \frac{L}{\sqrt{2}}$$

and with a bin grid orientation rotated 45° relative to the shooting directions of the first and second surveys; and
applying seismic data processing to the binned seismic data to create a higher resolution image of the earth's subsurface.

15. A computer readable medium with a computer program stored thereon, the program having logic operable to cause a programmable computer to perform steps comprising:
retrieving seismic data representative of earth's subsurface from a first survey, a second survey, and a third survey, wherein the first survey and the second survey are shot with a bin size of L×L, the second survey is shot with a shooting direction rotated 90° relative to the shooting direction of the first survey, and the third survey is shot with a bin size of $$\frac{L}{\sqrt{2}} \times \frac{L}{\sqrt{2}}$$

and with a shooting direction rotated 450 relative to the shooting directions of the first and second surveys;
transforming the seismic data into binned seismic data with a higher resolution bin grid, comprising:
combining the seismic data from the first, second, and third surveys; and
binning the combined seismic data from the first, second, and third surveys on a bin grid with a bin size of $$\frac{L}{2} \times \frac{L}{2}$$

and with a bin grid orientation parallel to the shooting direction of the first survey; and
applying seismic data processing to the binned seismic data to create a higher resolution image of the earth's subsurface.

16. The medium of claim 15, wherein sampling points in the third survey are interpolated so that resulting sampling points overlie sampling points in the first and second surveys.

17. The medium of claim 16, wherein the sampling points in the third survey are interpolated so that streamer spacing and receiver spacing are both decreased by a factor of $$\frac{1}{\sqrt{2}}$$

with respect to streamer spacing and receiver spacing, respectively, in the first and second surveys.

18. A computer readable medium with a computer program stored thereon, the program having logic operable to cause a programmable computer to perform steps comprising:
retrieving seismic data representative of earth's subsurface from a first survey, a second survey, a third survey, and a fourth survey, wherein the first survey and the second survey are shot with a bin size of L×L, the second survey is shot with a shooting direction rotated 90° relative to the shooting direction of the first survey, the third survey is shot with a bin size of $$\frac{L}{\sqrt{2}} \times \frac{L}{\sqrt{2}}$$

and with a shooting direction rotated 45° relative to the shooting directions of the first and second surveys, and the fourth survey is shot with a bin size of $$\frac{L}{\sqrt{2}} \times \frac{L}{\sqrt{2}}$$

and with a shooting direction rotated 90° relative to the shooting directions of the third survey;
transforming the seismic data into binned seismic data with a higher resolution bin grid, comprising:
combining the seismic data from the first, second, third and fourth surveys; and binning the combined seismic data from the first, second, third, and fourth surveys on a bin grid with a bin size of $$\frac{L}{2} \times \frac{L}{2}$$

and with a bin grid orientation parallel to the shooting direction of the first survey; and
applying seismic data processing to the binned seismic data to create a higher resolution image of the earth's subsurface.

19. The medium of claim 18, wherein sampling points in the fourth survey are interpolated so that resulting sampling points overlie sampling points in the first, second, and third surveys.

20. The medium of claim 19, wherein the sampling points in the fourth survey are interpolated so that streamer spacing and receiver spacing are both decreased by a factor of $$\frac{1}{\sqrt{2}}$$

with respect to streamer spacing and receiver spacing, respectively, in the first and second surveys.

21. The medium of claim 14, wherein sampling points in the first survey and sampling points in the second survey are interspaced so that sampling points of the first survey and sampling points of the second survey do not overlie each other.

22. A computer readable medium with a computer program stored thereon, the program having logic operable to cause a programmable computer to perform steps comprising:
retrieving combining seismic data representative of earth's subsurface from a first survey, a second survey, and a third survey, wherein the first, second, and third surveys are shot with a bin size of L×L, the second survey is shot with a shooting direction rotated 60° relative to the shooting direction of the first survey, and the third survey is shot with a shooting direction rotated 120° relative to the shooting direction of the first survey;
transforming the seismic data into binned seismic data with a higher resolution bin grid, comprising:
combining the seismic data from the first, second, and third surveys; and
binning the combined seismic data from the first, second, and third surveys on a bin grid with a bin size of $$\frac{L}{2} \times \frac{L}{2}$$

and with a bin grid orientation parallel to the shooting direction of the first survey; and
applying seismic data processing to the binned seismic data to create a higher resolution image of the earth's subsurface.

23. The medium of claim 22, wherein sampling points in the second and third surveys are interpolated so that resulting sampling points overlie sampling points in the first survey.

24. The medium of claim 22, wherein streamer spacing in the first, second, and third surveys is $$\frac{L(\sqrt{3})}{2}.$$

25. The medium of claim 24, wherein the streamer spacing is achieved by interpolation of the sampling points.

26. The medium of claim 24, wherein the streamer spacing is achieved by physical spacing of the streamers.

* * * * *